US006234323B1

(12) United States Patent
Sarrouh

(10) Patent No.: US 6,234,323 B1
(45) Date of Patent: May 22, 2001

(54) HEADER FOR A SLUDGE REMOVAL SYSTEM

(75) Inventor: Sami F. Sarrouh, Cleveland, OH (US)

(73) Assignee: Parkson Corporation, Fort Lauderdale, FL (US)

( * ) Notice: Subject to any disclaimer, the term of this patent is extended or adjusted under 35 U.S.C. 154(b) by 0 days.

(21) Appl. No.: 09/415,414

(22) Filed: Oct. 8, 1999

(51) Int. Cl.[7] .................................................. B01D 21/04
(52) U.S. Cl. ........................ 210/523; 210/236; 210/525; 210/803
(58) Field of Search ..................... 15/418, 420; 210/523, 210/525, 803, 236

(56) References Cited

U.S. PATENT DOCUMENTS

| 3,669,271 | 6/1972 | McGivern | 210/128 |
|---|---|---|---|
| 3,847,802 | 11/1974 | Lemke | 210/7 |
| 4,181,614 | 1/1980 | Steenhorst | 210/221 P |
| 4,401,576 | 8/1983 | Meurer | 210/803 |
| 4,857,185 | 8/1989 | Desjardins | 210/150 |
| 5,047,150 | 9/1991 | Mitchell | 210/525 |
| 5,078,869 | 1/1992 | DiGregorio et al. | 210/195.3 |
| 5,340,485 | 8/1994 | Bradley et al. | 210/767 |
| 5,772,885 | 6/1998 | Sarrouh | 210/523 |
| 5,911,241 | * | 6/1999 | Roberts . |
| 6,045,709 | * | 4/2000 | Roberts . |
| 6,073,779 | * | 6/2000 | Shea et al. . |

* cited by examiner

Primary Examiner—David A. Simmons
Assistant Examiner—Betsey Morrison Hoey
(74) Attorney, Agent, or Firm—Mason, Kolehmainen Rathburn & Wyss

(57) ABSTRACT

An elongated suction header for use in a sludge removal system is mounted transversely on a track guide that is mounted on and driven along a track rail affixed to a floor of a tank in a water treatment facility. As the track guide moves along the track rail, the header is moved transversely to the rail adjacent the floor of the tank. In cross section, the header has a top section that is generally dome shaped and extends from a bottom wall of the header. The ends of the top section overhang beyond or extend below the bottom wall along a longitudinal axis of the header. Inlet orifices are provided in the bottom wall of the header so that sludge is drawn into an inner compartment of the header when vacuum is applied to a vacuum port that extends through the top section of the header into the header compartment. In order to assist in channeling the sludge to the inlet orifices, flow splitters extend from the bottom wall between adjacent pairs of the inlet orifices. In order to equalize the distribution of pressure in the compartment to all of the inlet orifices, baffles extend from the vacuum port on either side of the inlet orifices for two different distances from the central vacuum port to subdivide the header compartment into three interconnected vacuum zones on each end of the header.

8 Claims, 3 Drawing Sheets

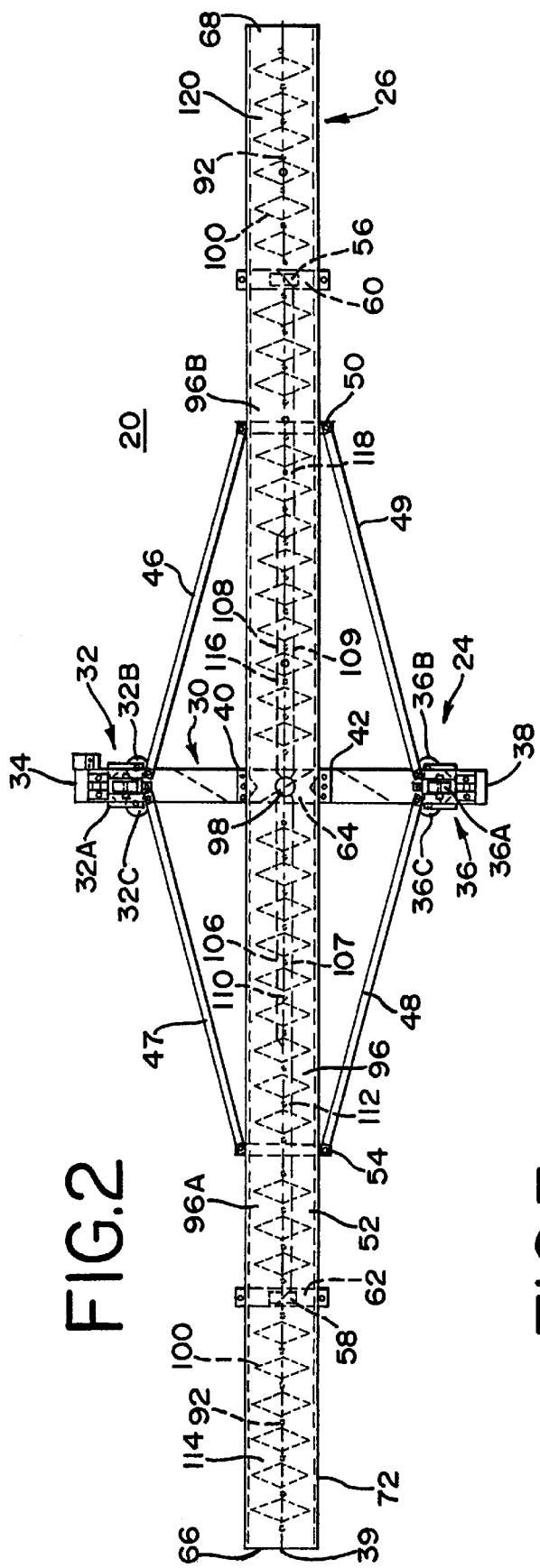
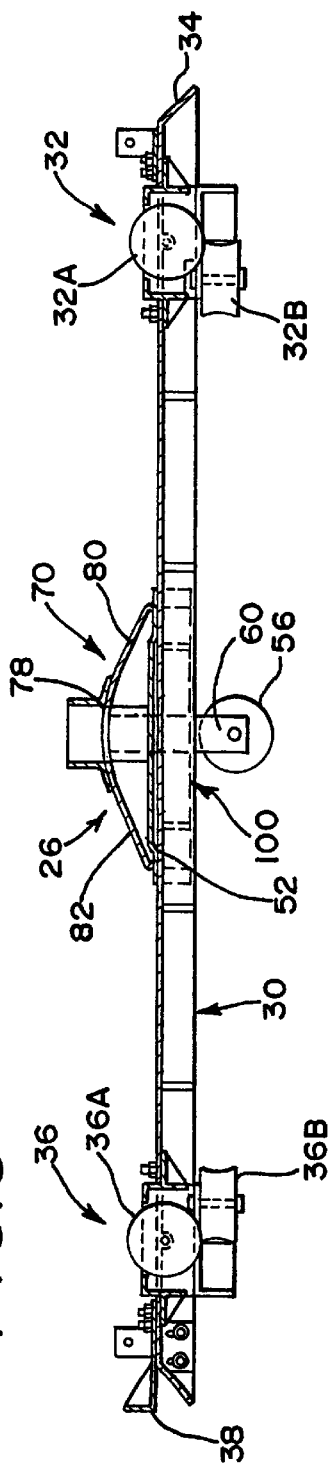
FIG. 2
FIG. 3

HEADER FOR A SLUDGE REMOVAL SYSTEM

BACKGROUND OF THE INVENTION

1. Field of the Invention

The present invention relates to water/wastewater treatment sludge removal systems, and more particularly, to a new and improved suction header for use with a water/wastewater treatment clarifier/thickener system.

2. Background of the Invention

Municipal water/wastewater treatment facilities treat water or wastewater in order to produce and then distribute potable water and to dispose of the industrial and municipal wastes contained in the water being treated. The amount of impurities in any particular raw water or raw sewage stream determines the amount of treatment that is required for such water or stream and is usually measured either by the amount of suspended solids or the biochemical oxygen demand. The treatment of water/sewage is typically divided into primary or physical treatment, secondary or biochemical treatment, and tertiary treatment. Improvements in any of these stages of treatment can dramatically affect the results obtained by the overall treatment.

The primary or physical treatment of water/sewage involves the removal of "settleable" solids. Fine particles tend to agglomerate so that they increase in size and settle to the bottom of a tank or the like that is a part of the treatment facility. In this regard, the coagulation of fine particles results in larger particles being formed mainly by flocculation. These larger particles are then removed by sedimentation. The total process is a clarification or thickening operation with the removed sediment often referred to as waste sludge. In its most basic form, a clarifier/thickener unit is used to decant liquid waste from any solid sludge.

In connection with such clarifier/thickener units, the waste sludge that settles to the bottom of the unit needs to be collected and removed. One way such solids can be removed from those units is with vacuum sludge collectors. Such collectors generally comprise a suction header which is rotated, slid, or otherwise translated or moved along the bottom of the clarifier unit, during which movement solids are removed without decanting or dewatering. In U.S. Pat. No. 5,772,885, issued on Jun. 30, 1998 to the inventor of the present application, a vacuum sludge removal unit is disclosed. As is described in the '885 patent, the vacuum sludge removal unit includes a sludge removal suction header with a generally triangular cross sectional shape so that a relatively large header in the cross sectional dimension is provided. With the suction header having a large width-to-height-above-ground ratio, "ground effects" are created during movement of the header across the bottom of the clarifier unit that results in the lowering of the pressure under the header (near the inlet holes through which the waste sludge is vacuumed into the header) and in improving the suction of solids during the movement of the header. Such a sludge collector allows more sludge to pass under the header in each translation of the header across the bottom surface so that more sludge is removed per each translation of the header. Otherwise, the installation of headers need to be very close to the bottom of the unit to avoid excessive amounts of cleaner water being removed from above the header due to gravity.

The particular triangular cross sectional shape of the header with an obtuse angle at the top or apex of the header results in a lower projected area of the header as it is being translated across sludge in the clarifier unit. This tends to minimize the resistance of the header as it moves within the liquid in the clarifier unit and also the header tends to cause less turbulence of the liquid as it is being translated within the clarifier unit. By minimizing such turbulence, the sludge remains settled (undisturbed) as the header passes over the sludge such that any interference with the suction's flow lines is minimized. In addition, the water coming from above the header is forced to separate from the header at the edges of the triangle. Consequently, the fluid has to travel a longer distance before reaching the suction inlet holes that are located underneath the header so that the zone where the waste sludge is influenced is increased. In fact, the mixing of fluid and sludge under the header tends to fluidize the sludge, and in combination with a low pressure around the suction inlet holes, aids in urging the fluidized sludge into the inlet holes. The triangular shape of the header of the '885 patent also provides a header with improved physical rigidity, especially in the direction of translation of the header, so that bowing of the header is minimized and the risk of damage to the header is decreased when the header encounters areas of thick sludge or other obstacles.

Another feature described in the '885 patent relates to equalizing the pressure distribution within the header. With a more uniform pressure distribution within the header, the flow distribution across all of the inlet holes (especially those holes at the end of the header which are furthest away from the vacuum source) is more uniform. In order to so equalize the pressure distribution, internal annular passages are disposed along the intersections of the outer walls of the header for equalizing the pressure distribution inside the header.

The particular cross sectional shape of the header member disclosed in the '885 patent improves the performance of the sludge removal system disclosed in that patent and the internal annular passages tend to equalize the pressure distribution inside the header member. However, the performance of a sludge removal system of the type disclosed in the '885 patent can be further improved by reconfiguring the cross sectional shape of the header member and the pressure distribution within the header member can be further improved by redesigning the distribution of the vacuum within the header member.

Accordingly, it is an object of the present invention to provide a new and improved sludge removal suction header for use with a municipal water/wastewater clarifier/settling system.

It is another object of the present invention to provide a new and improved sludge removal suction header for use with a municipal water/wastewater clarifier/settling system wherein the cross sectional shape of the header provides improved performance.

It is still another object of the present invention to provide a new and improved sludge removal suction header for use with a municipal water/wastewater clarifier/settling system wherein the cross sectional shape of the header has a generally convex or curved top section having overhanging wings extending below the bottom wall of the header.

It is yet another object of the present invention to provide a new and improved sludge removal suction header for use with a municipal water/wastewater clarifier/settling system having baffles within the header to equalize the pressure distribution within the header.

SUMMARY OF THE INVENTION

In accordance with these and many other objects of the present invention, a sludge removal system for water/ wastewater clarifier/settling system in a municipal water/ wastewater treatment facility includes a sludge removal suction header embodying the present invention. The sludge removal system has a drive system for moving or translating the header across the floor or bottom of a clarifier tank. The drive system has a track rail affixed to the bottom of the clarifier tank and a track guide that is mounted on and driven along the track rail. The header is an elongated structure that has a longitudinal axis and that is mounted transversely on the track guide. As the track guide moves along the track rail, the header on the track guide is moved transversely to the rail adjacent the floor of the clarifier tank. In cross section, the header has a top or roof section that is generally dome shaped and extends upwardly from a bottom wall of the header. The ends of the top section overhang beyond or extend below the bottom wall along the longitudinal axis of the header. The rounded top of the header provides even less resistance to the header moving through the wastewater in the clarifier tank and causes even less turbulence than the header disclosed in the '885 patent. In addition, the projecting or overhang portion of the top section tends to lessen the pressure under the header so that fluid more readily flows into a series of inlet suction holes or orifices in the bottom wall of the lower section of the header.

The inlet holes are provided in the bottom wall of the header so that sludge and the like is drawn into an inner chamber or compartment of the header when a vacuum is applied to a vacuum port that extends through the top section of the header into the header compartment. In order to assist in channeling the sludge to the inlet holes, flow splitters (diamond shaped projections) extend from the bottom wall of the header between each adjacent pair of inlet holes. In order to equalize the distribution of pressure within the header compartment and particularly to all of the inlet holes, baffles are provided that extend from the vacuum port on either side of the inlet holes for two different distances from the central vacuum port. As a result, the baffles effectively divide each elongated half of the header compartment into three pressure or vacuum zones or areas.

BRIEF DESCRIPTION OF THE DRAWINGS

These and many other objects and advantages of the present invention will become readily apparent from consideration of the following detailed description of the embodiment of the invention shown in the accompanying drawings wherein:

FIG. 2 is an elevation view of the sludge removal apparatus of FIG. 1 showing in part the internal baffles within the header of FIG. 1;

FIG. 3 is a side view of the sludge removal apparatus of FIG. 1 from an end of the header of FIG. 1;

DETAILED DESCRIPTION OF THE PREFERRED EMBODIMENT

Figure 1:
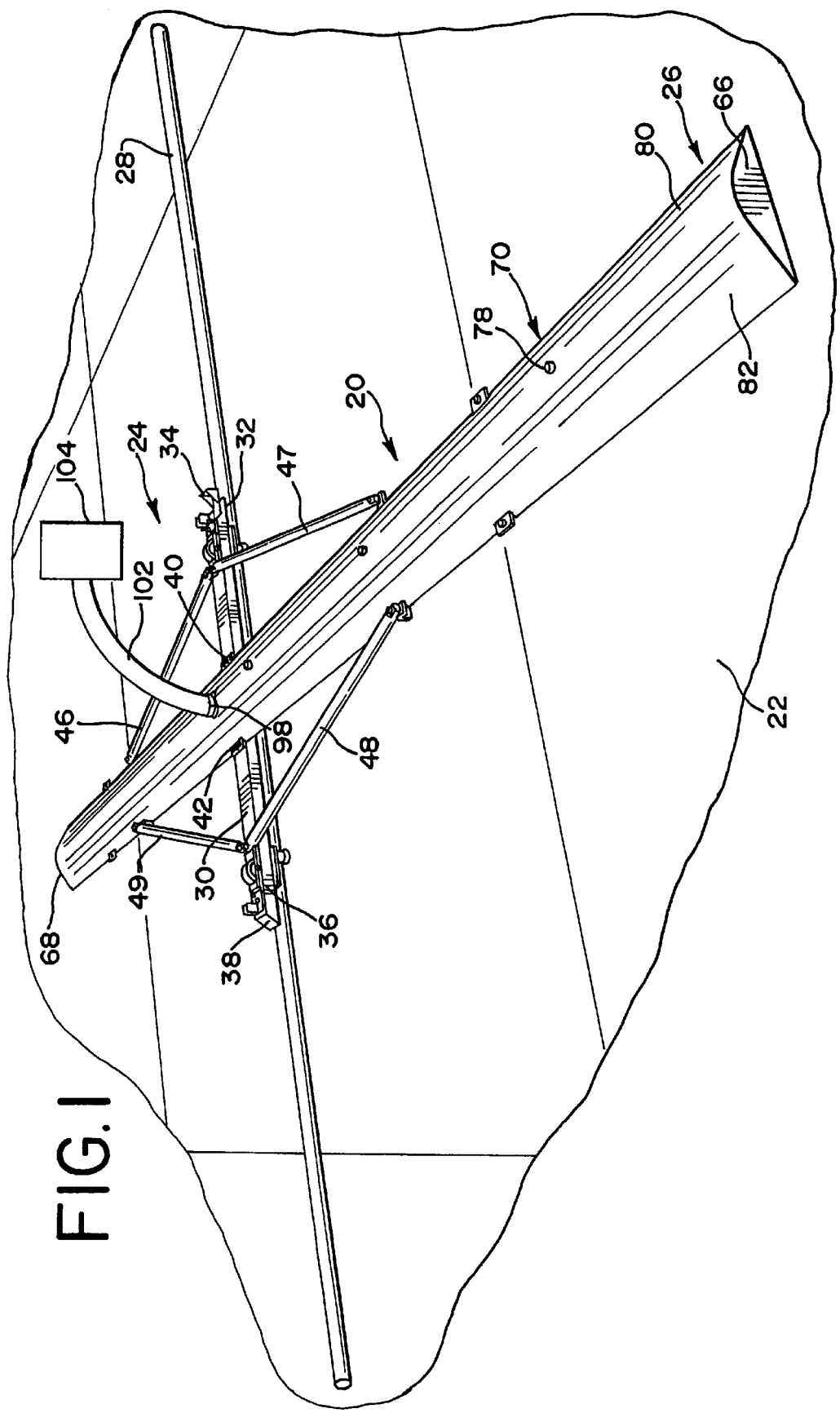
FIG. 1 is a perspective view of a sludge removal apparatus having a header which embodies the present invention.

Referring now more specifically to FIG. 1, therein is disclosed a sludge removal system 20 that is adapted to be mounted with respect to a floor 22 of a wastewater clarifier/ thickener tank in which raw water or wastewater is settled.

The sludge removal system 20 includes a drive system 24 for moving or translating a suction header 26 across the floor 22 in order to collect sludge and the like that is in the raw water or wastewater in the tank. It is the suction header 26 that embodies the present invention. In particular, the general configuration of the suction header 26 provides the sludge removal system 20 with a suction header that is more readily translated through the raw water or wastewater, provides a lower pressure area beneath the header 26 and improves the pressure distribution within the header 26 as compared to previous suction headers including specifically the suction header disclosed in U.S. Pat. No. 5,772,885, the disclosure of which is incorporated by reference in the present application.

As previously indicated, the sludge removal system 20 includes the drive system 24 for moving the header 26 across the floor 22 of the clarifier tank. In order to translate the suction header 26 along the floor 22, a track rail 28 is secured to the floor 22. An elongated track guide 30 is mounted onto the track rail 28. As is more clearly shown in FIGS. 2–3, the track guide 30 includes a roller drive mechanism 32 at a distal end 34 of the track guide 30 and a roller drive mechanism 36 at an opposite distal end 38 of the track guide 30. As is described in the '885 patent, which description is incorporated by reference in the present application, the roller drive mechanism 32 has a support roller 32A that rides along the top of the track rail 28 and a pair of guide rollers 32B and 32C that straddle the sides of the track rail 28. Similarly, the roller drive mechanism 36 has a support roller 36A that rides along the top of the track rail 28 and a pair of guide rollers 36B and 36C that straddle the sides of the track rail 28. By having the rollers 32A–32C and the rollers 36A–36C engage the track rail 28 in this fashion, the track guide 30 is permitted to rotate slightly with respect to the track rail 28 so that the header 26 also is permitted to tilt slightly with respect to the track rail so that either of the distal ends 34 or 38 can move away slightly from the floor 22. This enables the header 26 to be translated over the floor 22 even if the floor 22 is uneven or submerged obstacles are present in the clarifier tank. These drive mechanisms 32 and 36 also enable the application of greater translation forces being applied to the track guide 30 which may be necessary to plow the header 26 through sludge beds while preventing any derailment, tilt, or misalignment between the header 26 and the track rail 28.

As can be appreciated from FIGS. 1–3, the header 26 is an elongated structure with a central longitudinal axis 39. The header 26 is mounted on the track guide 30 at attachment areas 40 and 42 so that the header 26 extends transversely to the track guide 30. However, stresses are applied to the attachment areas 40 and 42 as the header 26 encounters obstructions, such as solid sludge impediments, irregular protrusions along the tank's floor 22 or the like. In order to provide the header 26 with additional rigidity, tension braces 46-49 extend between the header 26 and the track guide 30. The tension brace 46 extends from the track guide 30 near the roller mechanism 32 to a support 50 affixed to a bottom wall 52 of the header 26, the brace 47 extends from the track guide 30 near the roller mechanism 32 to a support 54 affixed to the bottom wall 52 of the header 26, the brace 48 extends from the support 54 to the track guide 30 near the roller mechanism 36 and the brace 49 extends from the track guide 30 near the roller mechanism 36 to the support 50. The header 26 is further supported by wheels 56 and 58 projecting respectively from the bottom wall 52 from wheel mounts 60 and 62. When the header 26 is being translated over the floor 22 and the header 26 is not tilted with respect to the track rail 28, the wheels 56 and 58 tend not to engage the floor 22. On the other hand, one or the other of the wheels 56 and 58 will engage the floor 22 when the header 26 is tilted. This ensures that the header 26 is not tilted to too great of an extent.

Figure 5:
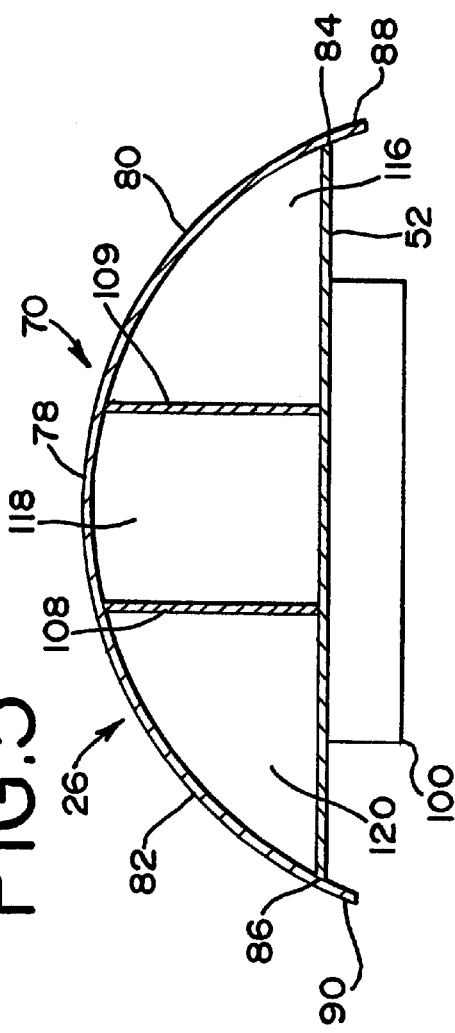
FIG. 5 is a diagrammatic view showing the overall cross sectional shape of the header of FIG. 1 together with subcompartments formed within the header by baffles.

The header 26 is an elongated hollow structure extending transversely to the track guide 30 from a central header area 64 to opposite distal header ends 66 and 68. As particularly seen in FIGS. 3 and 5 of the drawings, the header 26 is formed of a top or roof section 70 that extends upwardly from the bottom wall 52 and has a generally dome shape in cross section. In this regard, the top section 70 includes a convex or curved top portion 78 with side portions or sections 80 and 82 extending from the top portion 78 to respectively corners 84 and 86 where the bottom wall 52 intersects the side portions 80 and 82. As is seen in FIGS. 3 and 5 of the drawings, the side portion 80 extends beyond the corner 84 and below the bottom wall 52 to form an overhang or wing 88 and the side portion 82 extends beyond the corner 86 and below the bottom wall 52 to form an over-hang or wing 90.

This generally cross sectional shape of the header 26 provides the header 26 with a generally low projected area that is being translated through the water/wastewater and an aerodynamic surface along the top section 70 so that the water/wastewater can easily flow along that top section. As a result, the header 26 minimizes the resistance of the header 26 as it moves through the water/wastewater and minimizes any turbulence that may be caused by the header 26 as it is moved along the floor 22. By minimizing the turbulence in both front of and behind the moving header 26, the sludge remains settled near the floor 22 such that the movement of the header 26 minimizes interference with the flow of sludge into inlet or suction holes or orifices 92 extending through the bottom wall 52 of the header 26.

As is discussed in the '885 patent, the triangular shape of the header disclosed therein causes the fluid to travel a longer distance before reaching the suction holes so that a so-called "zone of influence" is expanded in that the water coming from above the header was forced to separate from the header at the edges of the triangle. The header 26 of the present application also provides for this expanded zone of influence because water has to flow from above the top section 70 of the header 26 along the side portions 80 or 82 and around the overhangs 88 and 90 before flowing into the suction holes 92. The overhangs 88 and 90 tend to lessen the pressure under the bottom wall 52 of the header 26. As a result, the sludge is fluidized and more readily flows into the suction holes 92.

Another advantage of the shape of the header 26 is its improved physical rigidity, especially in the direction of movement across the floor 22. With such improved rigidity, the header 26 will not tend to bow or otherwise bend as the header 26 is being moved through the wastewater. In addition, the shape of top section 70 decreases any tendency of the header 26 being damaged when the header encounters large areas of thick sludge or other obstacles.

Figure 4:
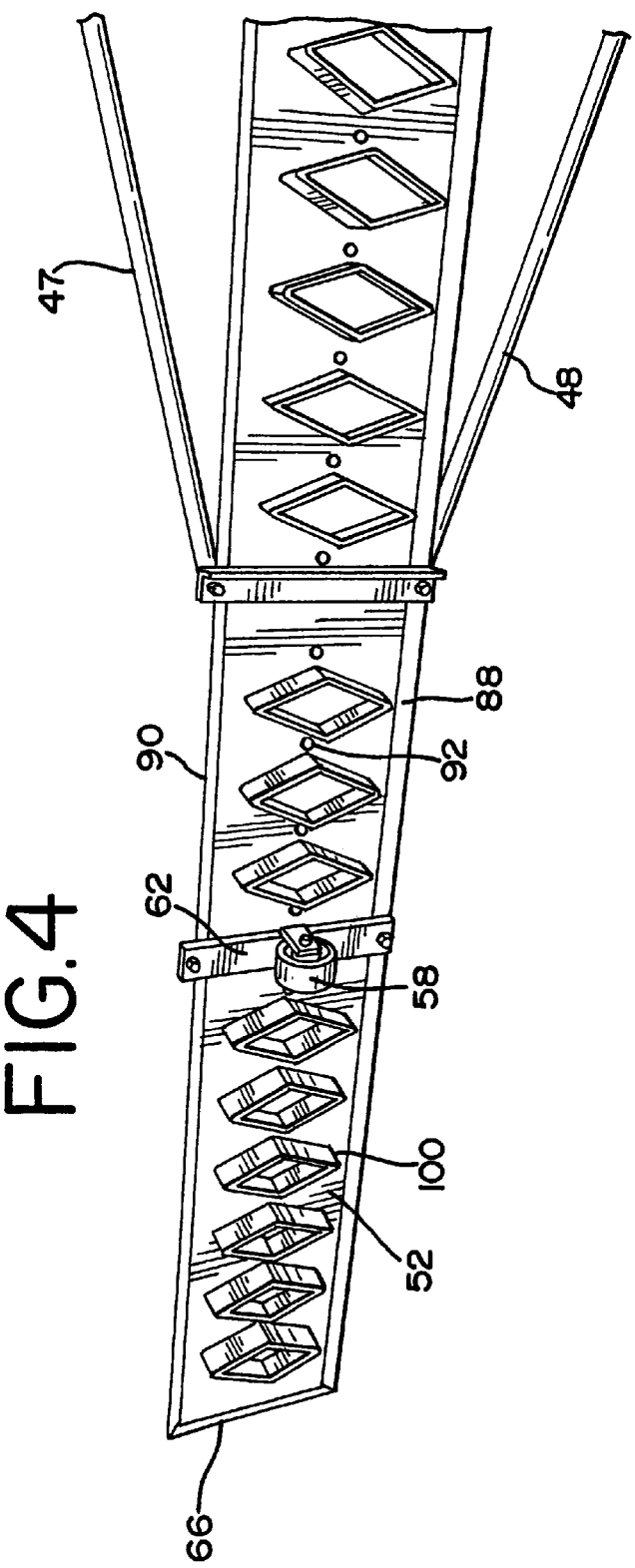
FIG. 4 is partial perspective view of a portion of the lower outer all of the header of FIG. 1.

As is particularly shown in FIGS. 2 and 4 of the drawings, the inlet suction holes 92 are aligned along the central elongated axis 39 of the header 26 in the bottom wall 52 of the header 26 and extend through the bottom wall 52 into an internal header compartment 96 that is formed by the bottom wall 52 and the upper section 70. As will be described in further detail hereinafter, sludge will be drawn into the suction holes 92 when a vacuum is applied to the header compartment 96 at a vacuum port 98 that extends through the top portion 78 of the upper section 70 into the header compartment 96 and is located in the central header area 64. In order to assist in channeling the flow of sludge into the suction holes 92, generally diamond shaped projections or flow splitters 100 extend from the bottom wall 52 and are positioned in between each adjacent pair of suction holes 92. In effect, these flow splitters 100 expand the areas where the sludge will flow into the suction holes 92.

As is particularly shown in FIG. 2 of the drawings, the header 26 is an elongated structure that extends to the distal ends 66 and 68 from the central header area 64 where the header 26 is secured to the track guide 30. As previously indicated, the header 26 is a hollow structure such that the internal header compartment 96 is formed by the lower section 72 and the upper section 70 with a subcompartment 96A extending from the central header area 64 to the distal end 66 and a subcompartment 96B extending from the central header area 64 to the distal end 68. As is also seen in FIG. 2, the suction holes 92 are located along the entire length of the central axis 39 with some of the suction holes 92 being close to the central header area 64 and others such suction holes 92 being nearer the distal ends 66 and 68 such that they are displaced relatively far from the central header area 64. As a result, the vacuum that is applied within the subcompartments 96A and 96B will not be equally distributed to the suction holes 92 due to the varying distance the suction holes 92 are located from the central header area 64. In this regard, the vacuum port 98 extends through the top portion 78 of the top section 70 at the central header area 64. A vacuum line 102 is connected between the vacuum port 98 and a vacuum source 104. When the vacuum source 104 is actuated, a vacuum is applied to the internal header compartment 96 such that sludge is drawn into the subcompartments 96A and 96B through the suction holes 92. In order to more uniformly distribute the flow throughout the subcompartments 96A and 96B, baffles 106–107 are disposed in the subcompartment 96A and baffles 108–109 are disposed in the subcompartment 96B.

The baffles 106–107 are illustrated in FIG. 2 of the drawings and extend toward the distal end 66 from the vacuum port 98 within the subcompartment 96A from the bottom wall 52 to the top portion 78. The baffle 106 extends along one side of only the first seven of the suction holes 92 located nearest the vacuum port 98 whereas the baffle 107 extends on the other side of those seven suction holes 92 and along the next seven adjacent suction holes 92. As a result, the baffles 106 and 107 effectively subdivide the subcompartment 96A into three vacuum zones or areas 110, 112, and 114 with the first seven suction holes 92 in the subcompartment 96A being in the vacuum area 110, the second seven suction holes 92 in the subcompartment 96A being in the vacuum area 112 and the last or far most seven suction holes 92 in the subcompartment 96A being in the vacuum area 114. Consequently, the flow within the subcompartment 96A is more uniformly distributed so that a sufficient amount of vacuum is supplied to each of the suction holes 92 including the far most seven such suction holes near the distal end 66.

The baffles 108–109 also are illustrated in FIG. 2 of the drawings and diagrammatically in FIG. 5 of the drawings. The baffles 108–109 extend toward the distal end 68 from the vacuum port 98 within the subcompartment 98B from the bottom wall 52 to the top portion 78. The baffle 108 extends along one side of only the first seven of the suction holes 92 located nearest the vacuum port 98 whereas the baffle 109 extends on the other side of those seven suction holes 92 and along the next seven adjacent suction holes 92. As a result, the baffles 108 and 109 effectively subdivide the subcompartment 96B into three vacuum zones or areas 116, 118, and 120 with the first seven suction holes 92 in the subcompartment 96B being in the vacuum area 116, the second seven suction holes 92 in the subcompartment 96B being in the vacuum area 118 and the last or far most seven suction holes 92 in the subcompartment 96B being in the vacuum area 120. Consequently, the flow within the subcompartment 96B is more uniformly distributed so that a sufficient amount of vacuum is supplied to each of the suction holes 92 including the far most seven such suction holes near the distal end 68.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A sludge removal system for collecting sludge from a tank comprising:
   an elongated header having a longitudinal axis, said header having a bottom wall and an upper section with said upper section having a curved upper portion and having side sections that extend below said bottom wall along said longitudinal axis;
   a plurality of suction orifices extending into said bottom wall; and
   a drive system for moving said header relative to said tank.

2. A sludge removal system as set forth in claim 1 including flow splitters extending from said bottom wall between adjacent ones of said suction orifices to channel said sludge towards said orifices.

3. A sludge removal system as set forth in claim 1 wherein each of said side portions extend from a side of said curved upper portion to below said bottom wall such that an overhang is formed along said longitudinal axis adjacent the edge of said bottom wall of said header.

4. A sludge removal system as set forth in claim 1 wherein said header is generally hollow so that a vacuum compartment is formed by said bottom wall and said upper section and wherein said header includes a vacuum port extending into said vacuum compartment and baffles extending from said vacuum port to subdivide said vacuum compartment into vacuum zones.

5. A sludge removal system as set forth in claim 1 wherein said drive system includes an elongated track guide that is driven along a track rail in said tank and said header is mounted generally transversely to said track guide so that said header is translated within said tank as said track guide is driven along said track rail.

6. A sludge removal system for collecting sludge from a tank comprising:
   a hollow elongated header with a vacuum compartment therein;
   a vacuum port extending into said vacuum compartment, said vacuum port being adapted to be connected to a vacuum source;
   a plurality of suction orifices extending into said vacuum compartment; and
   first and second baffles in said vacuum compartment, said first baffle extending from said vacuum port along said orifices located nearest said vacuum port and said second baffle extending from said vacuum port along additional ones of said suction orifices thereby subdividing said vacuum compartment into vacuum zones with the area of each of said vacuum zones being varied to equalize the flow through each of said vacuum zones.

7. A sludge removal system as set forth in claim 6 wherein said vacuum compartment is subdivided at said vacuum port into first and second vacuum compartments, said plurality of suction orifices extend into said first and second vacuum compartments and said first and second baffles subdivide each of said vacuum compartments into vacuum zones.

8. A sludge removal system as set forth in claim 7 wherein said first baffle is disposed on one lateral side of said suction orifices and said second baffle is disposed on the other lateral side of said suction orifices so that each of said vacuum compartments is subdivided into first, second and third vacuum zones with a first plurality of said suction orifices in said first vacuum zone, a second plurality of said suction orifices in said second vacuum zone and a third plurality of said suction orifices in said third vacuum zone.

* * * * *